US010018477B2

(12) United States Patent
Kim et al.

(10) Patent No.: US 10,018,477 B2
(45) Date of Patent: Jul. 10, 2018

(54) ADVANCED DRIVER ASSIST SYSTEM, VEHICLE INCLUDING THE SAME, AND METHOD FOR CONTROLLING THE SAME

(71) Applicants: HYUNDAI MOTOR COMPANY, Seoul (KR); KIA MOTORS CORPORATION, Seoul (KR)

(72) Inventors: Gyungjin Kim, Gunpo-si (KR); Dong Pil Yoon, Incheon (KR); Kwanghun Choi, Siheung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 33 days.

(21) Appl. No.: 15/172,866

(22) Filed: Jun. 3, 2016

(65) Prior Publication Data

US 2017/0115127 A1 Apr. 27, 2017

(30) Foreign Application Priority Data

Oct. 21, 2015 (KR) .................... 10-2015-0146532

(51) Int. Cl.
  *G01C 21/36* (2006.01)
  *G01S 19/42* (2010.01)
  (Continued)

(52) U.S. Cl.
  CPC ........ *G01C 21/3605* (2013.01); *B60R 16/023* (2013.01); *B60W 30/00* (2013.01); *G01C 21/3667* (2013.01); *G01S 19/42* (2013.01)

(58) Field of Classification Search
  CPC ............ G01C 21/3605; G01C 21/3667; B60R 16/023; B60W 30/00; G01S 19/42
  See application file for complete search history.

(56) References Cited

U.S. PATENT DOCUMENTS 6,230,083 B1 * 5/2001 Matsuda ................ G01C 21/26
  340/995.1
9,182,035 B2 * 11/2015 Jeong .................. F16H 61/0204
  (Continued)

FOREIGN PATENT DOCUMENTS

JP 2010-086544 A 4/2010
JP 2015-102243 A 6/2015
  (Continued)

OTHER PUBLICATIONS

Lee et al., "Performance Assessments of Three Line Simplification Algorithms with Tolerance Changes", http://dx.doi.org/10_7848/ksgpc.2012.30.4, pp. 363-368 with English abstract.
  (Continued)

*Primary Examiner* — Anne M Antonucci
(74) *Attorney, Agent, or Firm* — McDermott Will & Emery LLP

(57) ABSTRACT

An advanced driver assist system (ADAS) comprises a user interface (UI) configured to receive a destination from a user; a communicator configured to transmit position information of a vehicle; a route information transmission device configured to calculate a current position of the vehicle based on the position information and to transmit road model information by modeling map information of a traveling route from the calculated current position to the destination; and an ADAS control device configured to output a section residual distance for each road model, a section average valid gradient, and a section average valid curvature using the transmitted road model information.

16 Claims, 15 Drawing Sheets

(51) Int. Cl.
*B60R 16/023* (2006.01)
*B60W 30/00* (2006.01)

(56) References Cited

U.S. PATENT DOCUMENTS

| | | | | |
|---|---|---|---|---|
| 9,435,885 B2* | 9/2016 | Fritsch | ............... | B62D 6/007 |
| 2010/0079590 A1* | 4/2010 | Kuehnle | ............ | G06K 9/00798 |
| | | | | 348/118 |
| 2013/0079990 A1* | 3/2013 | Fritsch | ............... | B62D 6/007 |
| | | | | 701/41 |
| 2014/0249716 A1* | 9/2014 | Dorum | ............... | G01C 21/32 |
| | | | | 701/36 |

FOREIGN PATENT DOCUMENTS

| | | |
|---|---|---|
| KR | 10-2013-0036549 A | 4/2013 |
| KR | 10-2015-0025394 A | 3/2015 |
| WO | 2014/068094 A1 | 5/2014 |

OTHER PUBLICATIONS

Park et al., "A Study on Automatic Threshold Selection in Line Simplification for Pedestrian Road Network Using Road Attribut Data", Journal of the Korean Society of Surveying, Geodesy, Photogrammetry and Cartography, vol. 31, No. 4, (2013) pp. 269-275 with English abstract.

* cited by examiner

FIG. 4

| Index | 1 | 2 | 3 |
|---|---|---|---|
| GRADIENT | DOWNHILL ROAD | FLATLAND | UPHILL ROAD |
| CURVATURE | LEFT CURVE | STRAIGHT LINE | RIGHT CURVE |

FIG. 5

| 27 TYPES (3^3) | 111 | 121 | 131 | 211 | 221 | 231 | 311 | 321 | 331 |
|---|---|---|---|---|---|---|---|---|---|
| | 112 | 122 | 132 | 212 | 222 | 232 | 312 | 322 | 332 |
| | 113 | 123 | 133 | 213 | 223 | 233 | 313 | 323 | 333 |

FIG. 6

| 21 TYPES | 1 | 121 | 131 | 21 | 231 | 31 | 321 | — |
| --- | --- | --- | --- | --- | --- | --- | --- | --- |
| | 12 | | 132 | 212 | 2 | 232 | 312 | 32 | |
| | 13 | 123 | — | 213 | 23 | 313 | 323 | 3 |

ADVANCED DRIVER ASSIST SYSTEM, VEHICLE INCLUDING THE SAME, AND METHOD FOR CONTROLLING THE SAME

CROSS-REFERENCE TO RELATED APPLICATION

This application claims the benefit of priority to Korean Patent Application No. 10-2015-0146532, filed on Oct. 21, 2015 in the Korean Intellectual Property Office, the disclosure of which is incorporated herein by reference.

TECHNICAL FIELD

The present disclosure relates to an advanced driver assist system (ADAS), a vehicle including the same, and a method for controlling the same.

BACKGROUND

A vehicle can perform basic traveling functions and additional functions for user convenience, for example, an audio function, a video function, a navigation function, an air-conditioning control function, a seat control function, an illumination control function, etc.

In order to perform the above-mentioned functions, an audio device, a multimedia device, a navigation device are integrated into one system, for example, an audio video navigation (AVN) device. The AVN device is embedded in the vehicle. The AVN device may provide a radio service for reproducing a radio program on the basis of terrestrial radio signals, an audio service for reproducing a compact disc (CD) and the like, a video service for reproducing a digital versatile disc (DVD), and the like, and a navigation service for providing a navigation function.

Recently, with the increasing development of vehicle information technology (IT), an advanced driver assist system (ADAS) has been introduced to improve safety of vehicle travel and user convenience. The ADAS has rapidly evolved into a map based ADAS capable of performing various functions using map and position information acquired through a navigation function of an AVN device.

In order to develop the map based ADAS, a curvature shape and vehicle speed information are needed to estimate a traveling situation from road topographical information having continuity or discontinuity present in a precise map of a traveling route. Therefore, since the amount of map information requisite for the map based ADAS geometrically increases, excessive load occurs in the system during transmission and modeling of the map information. As a result, a method for addressing the above-mentioned problem is needed.

SUMMARY

An aspect of the present disclosure provides a map based advanced driver assist system (ADAS) for optimizing the transmission specification and reducing system load by linearly simplifying map information on a traveling route, a vehicle including the map based ADAS, and a method for controlling the map based ADAS.

Additional aspects will be set forth in part in the description which follows and, in part, will be obvious from the description, or may be learned by practice of the invention.

In accordance with an embodiment in the present disclosure, an advanced driver assist system (ADAS) includes: a user interface (UI) configured to receive a destination from a user; a communicator configured to transmit position information of a vehicle; a route information transmission device configured to calculate a current position of the vehicle based on the position information and to transmit road model information by modeling map information of a traveling route from the calculated current position to the destination; and an ADAS control device configured to output a section residual distance for each road model, a section average valid gradient, and a section average valid curvature using the transmitted road model information.

The route information transmission device may include: a route information extractor configured to search for a traveling route from the current position to the destination, match the searched traveling route to a map, and extract road modeling database (DB) information; and a road modeler configured to receive the road modeling DB information extracted from the route information extractor, and calculate section information having two types of precisions and a curved road model using a map information linear simplification algorithm. The section information includes a gradient, a curvature, and a vehicle speed.

The road modeler may define three road shapes on which the vehicle travels, may divide the traveling route into a plurality of forward sections, and may transmit a section distance for each road model, an average valid gradient, an average valid curvature, and average valid vehicle speed information as an event signal.

The road modeler may divide the traveling route into three forward sections, may determine in real-time three forward sections of the route using a section band to a maximum modeling distance, and may then transmit a section distance for each road model, an average valid gradient, an average valid curvature, average valid vehicle speed information on the basis of the three forward sections.

The road modeler may continuously transmit road model information for each of three initial proximity forward sections on which the vehicle travels, may update information of the maximum of three forward sections whenever the vehicle passes through one section, and may transmit a signal related to the updated result.

The ADAS control device may include: a route information corrector configured to receive the road model information from the road modeler, and determine the presence or absence of validity of the road model information; and an ADAS controller configured to control various ADAS functions using valid route information decided by the route information corrector.

The route information corrector may store a forward-section residual distance for each road model of the decided road model information, a forward-section average valid gradient, a forward-section average valid curvature, and a forward-section average valid vehicle speed.

The route information transmission device and the ADAS control device may communicate with each other through controller area network (CAN) communication.

In accordance with another embodiment in the present disclosure, an advanced driver assist system (ADAS) includes: a user interface (UI) configured to receive a destination from a user; a communicator configured to transmit position information of a vehicle; a route information extractor configured to calculate a current position of the vehicle based on the position information, search for a traveling route from the calculated current position to the destination, match the searched traveling route to a map, and extract road modeling database (DB) information; a road modeler configured to receive the road modeling DB information extracted from the route information extractor, and calculate a short-distance/long-distance gradient road model and a curved road model using a map information linear simplification algorithm; and a route information corrector configured to determine presence or absence of validity of road model information upon receiving the road model information from the road modeler, and store a forward-section residual distance for each road model of the road model information, a forward-section average valid gradient, a forward-section average valid curvature, and a forward-section average valid vehicle speed.

The ADAS may further include: an ADAS controller configured to control various ADAS functions using a forward-section residual distance for each road model, a forward-section average valid gradient, a forward-section average valid curvature, and a forward-section average valid vehicle speed.

In accordance with another embodiment in the present disclosure, a vehicle including an advanced driver assist system (ADAS) includes: a user interface (UI) configured to receive a destination from a user; a route information transmission device configured to search for a traveling route from a current position to the destination using a route search algorithm and to transmit road model information by modeling road information of the traveling route; and an advanced driver assist system (ADAS) control device configured to determine presence or absence of validity of the transmitted road model information, and output a section residual distance for each road model, a section average valid gradient, and a section average valid curvature.

In accordance with another embodiment in the present disclosure, a method for controlling an advanced driver assist system (ADAS) includes: receiving a destination through a user interface (UI); receiving position information of a vehicle through a communicator; calculating, by a communicator, a current position of the vehicle on the basis of the position information, and searching for a traveling route from the calculated current position to the destination; transmitting, by a route information transmission device, road model information by modeling map information of the searched traveling route; and determining, by the route information transmission device, presence or absence of validity of the transmitted road model information, and outputting a section residual distance for each road model, a section average valid gradient, and a section average valid curvature.

The step of transmitting the road model information may include: extracting road modeling database (DB) information by matching the searched traveling route to a map; and modeling a short-distance/long-distance gradient road model and a curved road model from the extracted road modeling DB information using a map information linear simplification algorithm.

The method may further include: prior to modeling the short-distance/long-distance gradient road model and curved road model, filtering out the road modeling DB information.

The step of modeling the road model may include: defining three road shapes on which the vehicle travels; dividing the traveling route into three forward sections using a section band to a maximum modeling distance; and transmitting a section distance for each road model, an average valid gradient, an average valid gradient, and an average valid vehicle speed as an event signal on the basis of the three forward sections.

The step of modeling the road model may further include: transmitting a section distance for each of the three forward sections and an average valid gradient by modeling the gradient road model.

The step of modeling the road model may further include: transmitting a section residual distance for each of the three forward sections and an average valid curvature by modeling the curved road model.

The step of transmitting the signal may include: continuously transmitting road model information for each of three initial proximity forward sections on which the vehicle travels; and updating information of a maximum of three forward sections whenever the vehicle passes through one section, and transmitting a signal.

The step of determining the presence or absence of validity of the road model information may include: if a modeling section distance is longer than a minimum section valid distance, determining the presence of a valid section; and if the modeling section distance is shorter than the minimum section valid distance, determining the presence of an invalid section.

The method may further include: controlling an ADAS function using the section residual distance for each road model, the section average valid gradient, and the section average valid curvature.

The ADAS may control the ADAS function through controller area network (CAN) communication.

BRIEF DESCRIPTION OF THE DRAWINGS

These and/or other aspects will become apparent and more readily appreciated from the following description of the embodiments, taken in conjunction with the accompanying drawings.

FIG. 4 illustrates a table in which three road shapes are defined in a map based ADAS according to an embodiment in the present disclosure.

FIG. 5 illustrates a gradient profile of actual roads represented by gradient types defined in FIG. 4.

FIG. 6 illustrates a gradient profile from which overlap types of FIG. 5 are removed.

DETAILED DESCRIPTION

Figure 1:
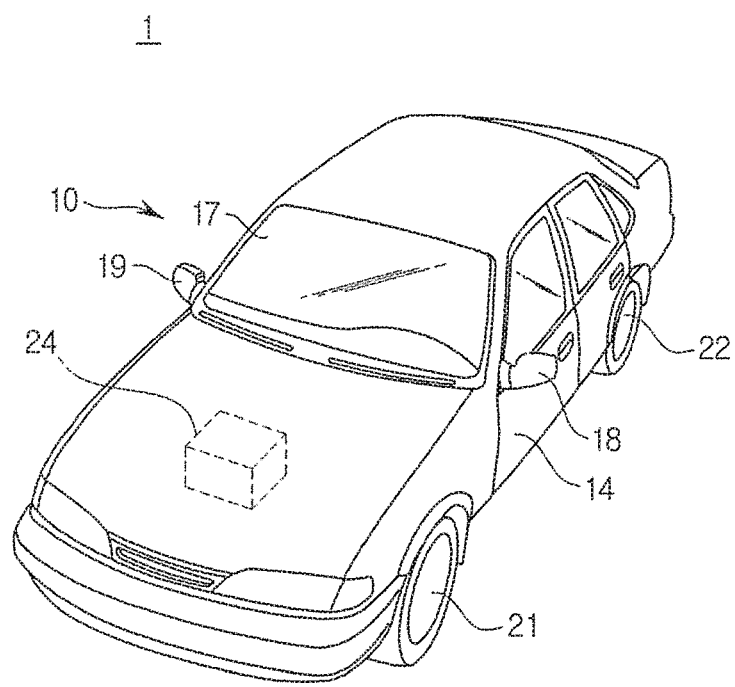
FIG. 1 is a view illustrating an appearance of a vehicle according to an embodiment in the present disclosure.

Reference will now be made in detail to embodiments in the present disclosure, examples of which are illustrated in the accompanying drawings, wherein like reference numerals refer to like elements throughout.

The terms used in the specification are merely used to describe specific embodiments and are not intended to limit the present disclosure. A singular expression may include a plural expression unless otherwise stated in the context. In the specification, the terms "including" or "having" are used to indicate that features, numbers, steps, operations, components, parts or combinations thereof described in the present specification are present and presence or addition of one or more other features, numbers, steps, operations, components, parts, or combinations thereof is not excluded.

In description, the terms "first" and "second" may be used to describe various components, but the components are not limited by the terms. The terms may be used to distinguish one component from another component.

A map based advanced driver assist system (ADAS), a vehicle including the same, and a method for controlling the same according to embodiments will hereinafter be described with reference to the attached drawings.

FIG. 1 is a view illustrating an appearance of a vehicle according to an embodiment in the present disclosure.

Referring to FIG. 1, a vehicle 1 according to an embodiment includes a main body 10 forming the appearance of the vehicle 1, vehicle wheels to move the vehicle 1 from place to place, a drive unit 24 to rotate the vehicle wheels, doors 14 to shield an indoor space of the vehicle 1 from outside, a vehicle windshield 17 to provide a forward view of the vehicle 1 to a vehicle driver who rides in the vehicle 1, and side-view mirrors to provide a rear view of the vehicle 1 to the vehicle driver.

The wheels may include front wheels 21 provided at the front of the vehicle 1 and rear wheels 22 provided at the rear of the vehicle 1. The drive unit 24 may provide rotational force to the front wheels 21 or the rear wheels 22 so that the main body 10 moves forward or backward. The drive unit 24 may include an engine to generate rotational force by burning fossil fuels or a motor to generate rotational force upon receiving power from a condenser (not shown).

The doors 14 are rotatably provided at right and left sides of the main body 10 for a vehicle driver to enter the vehicle 1 when any of the doors 14 is open and to protect an indoor space of the vehicle 1 from the outside when the doors 14 are closed.

The windshield 17 is provided at a front upper portion of the main body 10 so that the driver in the vehicle 1 can obtain visual information of a forward direction of the vehicle 1. The windshield 17 may also be referred to as a windshield glass.

The side-view mirrors may include a left side-view mirror 18 provided at the left side of the main body 10 and a right side-view mirror 19 provided at the right side of the main body 10. Thus, the driver can obtain visual information of lateral and rear directions of the vehicle 1.

The vehicle 1 may further include a variety of sensing devices, for example, a proximity sensor to detect the presence of obstacles located at the lateral and rear directions of the vehicle 1, a rain sensor to detect the presence or absence of rainfall and the amount of rainfall, etc.

For example, the proximity sensor emits a sensing signal to a lateral direction or a backward direction of the vehicle, and receives a signal reflected from obstacles such as other vehicles. In addition, the proximity sensor may detect the presence or absence of an obstacle located at the rear of the vehicle 1 on the basis of a waveform of the received reflection signal, and may recognize the position of obstacle. The proximity sensor may emit ultrasonic waves, and may detect the distance to the obstacle using the ultrasonic waves reflected from the obstacle.

Figure 2:
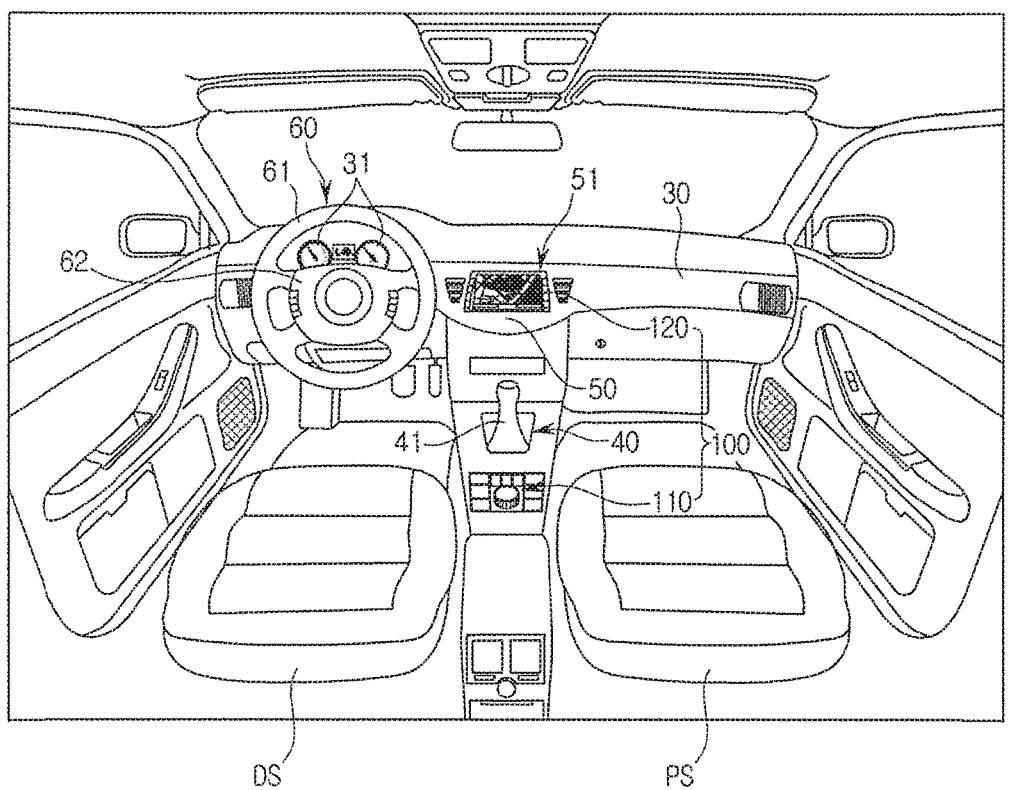
FIG. 2 is a view illustrating an internal structure of a vehicle according to an embodiment in the present disclosure.

FIG. 2 is a view illustrating an internal structure of a vehicle according to an embodiment in the present disclosure.

Referring to FIG. 2, the vehicle 1 may have seats on which a passenger and a driver sit; a dashboard 30 to operate various operations of the vehicle 1 as well as to include various instrument panels displaying operational information of the vehicle 1; and a steering wheel to steer the vehicle 1.

The seats may include a driver seat DS, a passenger seat PS, and a rear seat arranged in the rear of the driver seat DS and the passenger seat PS.

The dashboard 30 may include an instrument panel 31 (including a speedometer, a fuel gauge, an automatic transmission shift indicator, a tachometer, and a mileage indicator, which are arranged on the dashboard to output information related to driving), a gearbox 40, a center console (also called a center fascia) 50, etc.

A gearshift 41 for vehicle gear-shifting may be installed at the gearbox 40. In addition, an input 110 for allowing a user to control an audio video navigation (AVN) device 51 or the principal functions of the vehicle may be installed at the gearbox 40.

The center console 50 may include an air-conditioner, a clock, the AVN device 51, etc. The air-conditioner 50 can maintain temperature, humidity, purity, and airflow of indoor air of the vehicle 1 for comfortable or pleasant conditions. The air-conditioner may be installed at the center console 50, and may include at least one air outlet through which air is discharged to outside. A button or dial for controlling the air-conditioner may be installed at the center console 50. A user such as the driver may control the air-conditioner of the vehicle 1 using the button or dial mounted to the center console 50.

The AVN device 51, in which an audio and multimedia device and a navigation device embedded in the vehicle 1 are integrated into one system, is designed. The AVN device 51 may provide a radio service for reproducing a radio program on the basis of terrestrial radio signals, an audio service for reproducing a compact disc (CD) and the like, a video service for reproducing a digital versatile disc (DVD) and the like, a navigation service for providing a navigation function, and a phone service for controlling information as to whether a mobile phone connected to the vehicle 1 receives a phone call from another party. In addition, the AVN device 51 may also provide a voice recognition service upon receiving a voice signal instead of a user manipulation signal, and the voice recognition service may provide a radio service, an audio service, a video service, a navigation service, and a phone call service.

In addition, the AVN device 51 may include a universal serial bus (USB) port, and the like, may be connected to multimedia portable devices, for example, a portable multimedia player (PMP), an MPEG audio layer-3 (MP3)

player, a personal digital assistants (PDA), etc., and may reproduce audio and video files as necessary.

The AVN device 51 may be installed at a top portion of the dashboard 30, and may be embedded in the center console 50.

The user may receive the radio service, the audio service, the video service, and the navigation service through the AVN device 51.

Here, the AVN device 51 may be referred to as a navigation terminal, and may also be referred to by various terms well known to those skilled in the art as necessary.

In the present disclosure, an input unit for controlling the AVN device 51 may also be installed at the center console 50. In accordance with another embodiment, the input unit of the AVN device 51 may also be installed at other positions instead of the center console 50. For example, the input unit of the AVN device 51 may also be formed in the vicinity of a display 120 of the AVN device 51. In another example, the input unit of the AVN device 51 may also be installed at the gearbox 40 or the like.

The steering wheel 60 adjusts a travel direction of the vehicle 1 and is connected to a rim 61 grasped by the driver and a steering device of the vehicle. The steering wheel 60 includes a spoke 62 to connect the rim 61 to a hub of a rotation axis for steering. In accordance with one embodiment, the spoke 62 may include various devices embedded in the vehicle 1, for example, manipulation devices for controlling the AVN device 51, etc.

The display 120 may display execution images of various functions embedded in the AVN device 51 according to a user manipulation signal. For example, the display 120 may selectively display at least one of a radio screen image, an audio screen image, a video screen image, a navigation screen image, and a phone screen image. In addition, the display 120 may display various control screen images associated with control of the vehicle 1, may also display screen images associated with additional functions capable of being executed in the AVN device 51.

In accordance with one embodiment, the AVN device 51 interoperable with the above air-conditioner may display various control screen images associated with the air-conditioner control through the display 120. In addition, the AVN device 51 may adjust the air-conditioning environment of the vehicle 1 by controlling the operation state of the air-conditioner. In addition, the AVN device 51 may display a map including a route to a destination on the display 120 for recognition of the vehicle driver, and a detailed description thereof will hereinafter be given.

The display 120 may construct not only the input 110 embedded in the gearbox 40, but also a user interface (UI) 100.

The user interface (UI) 100 may control the AVN device 51 embedded in the vehicle 1 to interact with the user. The user interface (UI) 100 may receive a user command using a keypad, a remote-controller, a jog dial (knob), a touchpad, etc. If letters or menus displayed on the display 120 are selected by a user, the UI 100 can receive a user command from the user.

Figure 3:
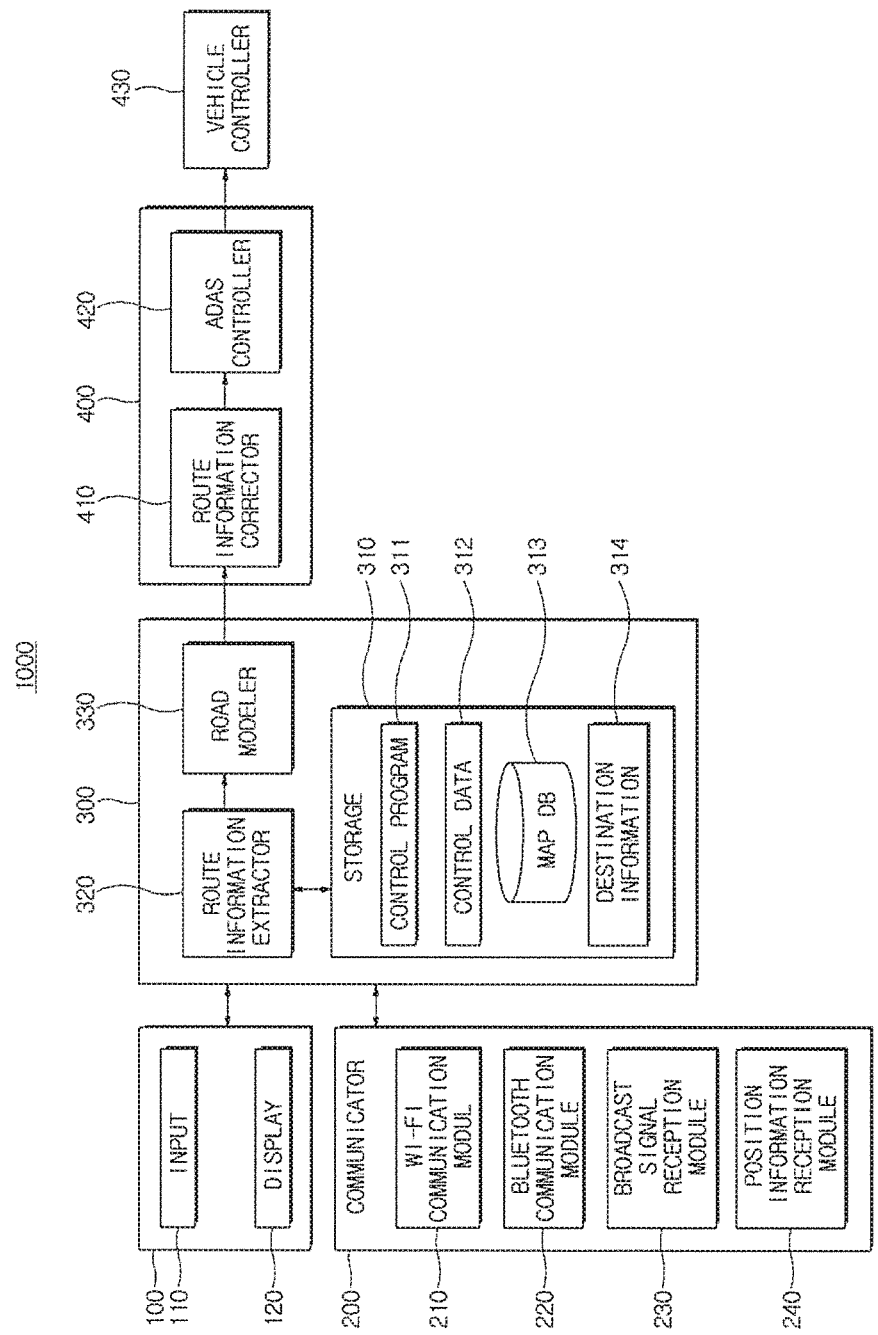
FIG. 3 is a control block diagram illustrating a map based advanced driver assist system (ADAS) according to an embodiment in the present disclosure.

FIG. 3 is a control block diagram illustrating a map based ADAS according to an embodiment in the present disclosure.

Referring to FIG. 3, a map based ADAS 1000 according to an embodiment may include the user interface (UI) 100, a communicator 200, a route information transmission device 300, and an advanced driver assist system (ADAS) device 400.

The UI 100 may receive a desired destination from the user, and may display a map for navigation, road environment information, and operation information regarding a user command. For this purpose, the UI 100 may include an input 110 and a display 120.

The input 110 may receive a navigation command and destination information from the user, and may transmit the destination information to the route information transmission device 300.

The display 120 may display functions of the route information transmission device 300 handled by the user through the input 110, and may display operation information on a user-selected function.

In addition, the display 120 may display images of a manipulation mode through which user command information can be input, may display operation information regarding a navigation function such as map and road environment information for navigation. In addition, the display 120 may display digital media broadcasting (DMB) images, audio music information, and search images for Internet search.

In addition, the display 120 may display a photographic map or a graphic map thereon, and may simultaneously display the photographic map and the graphic map upon receiving a command from the user.

The display 120 may display information related to telephone conversation, may display information related to playing music, and may also display external broadcast signals as images as necessary.

Here, the display 120 may be implemented by any one of a liquid crystal display (LCD) panel, a light emitting diode (LED) panel, an organic light emitting diode (OLED) panel, etc., without being limited thereto.

The display 120 may include a touch screen panel (TSP) configured to receive a control command from the user as well as to display operation information corresponding to the received control command.

The touch screen panel (TSP) may include a display for displaying operation information and user-input control commands, a touch panel for detecting coordinates contacting some parts of a user's body, and a touchscreen controller for determining the user-input control command on the basis of the contact coordinates detected by the TSP.

The touchscreen controller may compare user-touched coordinates detected through the touch panel with control command coordinates displayed through the display 120, such that it can recognize the user-input control command.

The communicator 200 may include a wireless fidelity (Wi-Fi) communication module 210 for connecting to a local area network (LAN) through an access point (AP) or the like; a Bluetooth communication module 220 to communicate with a single external device on a one-to-one basis or to communicate with a small number of external devices on a one-to-multiple basis; a broadcast reception module 230 to receive a digital broadcast signal; and a position information reception module 240 to receive position information of the vehicle from a satellite or the like.

In addition, the communicator 200 may also be connected to other devices using any one of GSM/3GPP-based schemes (GSM, HSDPA, LTE Advanced, etc.), 3GPP2-based schemes (such as CDMA), or WiMAX-based communication schemes.

The communicator 200 may transmit or receive current position information of the vehicle 1 to or from a global positioning system (GPS) satellite by communicating with the GPS satellite, or may transmit or receive map information from a server located at a remote site. The above-mentioned position and map information of the vehicle 1 may be used to provide a route to a destination established by the user.

In addition; the communicator 200 may be connected to other devices such that it can transmit or receive multimedia data. In more detail, the communicator 200 is connected to a mobile terminal located in the vicinity of the vehicle 1 or to the server located at a remote site, such that it can transmit multimedia data from the mobile terminal or the server. For example, the communicator 200 may be connected to a smartphone of the user, such that it can receive multimedia data stored in the smartphone.

The route information transmission device 300 may be implemented as a navigation device, which calculates a current position of the vehicle 1 on the basis of position information received through the communicator 200, and transmits road modeling information by calculating a road model obtained by linearly simplifying map information of a traveling route ranging from a current position to a destination. The navigation device may include a storage 310, a route information extractor 320, and a road modeler 330.

The storage 310 may store various kinds of data needed to operate the route information transmission device 300. That is, the storage 310 may store various applications needed to provide an operating system or information needed to drive the route information transmission device 300.

In detail, the storage 310 may store a control program 311 to control the route information transmission device 300; control data 312 to control the operation of the route information transmission device 300; a map database (DB) 313 to include map data and road data; and destination information 314 related to a user-input destination.

In this case, the map data may be a map through which the route information transmission device 300 can provide a route to a user. The road data may be specific information related to roads contained in a map displayed for user recognition such that the road data can inform the user of the route or path to the destination using the road data.

The road data may include road information needed for vehicle traveling and navigation services, for example, positions of roads, a length of road, a speed limit of road, etc. In addition, the road contained in the map is divided into a plurality of road sections on the basis of specific information as to whether the road intersects the street or other roads. The road data may include road information of the divided road sections.

The destination information 314 may be associated with a destination obtained when the user searches for a route through the route information transmission device 300. The destination information 314 may include a search date at which a user searches for the destination, a destination name, a destination address, longitude and latitude of the destination, etc.

In more detail, if the user inputs a desired destination to the route information transmission device 300 and receives a navigation service to the destination through the route information transmission device 300, the route information transmission device 300 may automatically store information related to the corresponding destination in the storage 310. As described above, destination related information stored in the storage 310 may be used as destination information 314.

Besides, the storage 310 may store operation data generated when the route information transmission device 300 performs a predetermined operation.

The storage 310 may be configured as at least one of a flash memory type, a hard disk type, a card type memory (e.g. a secure digital (SD) memory or an eXtreme digital (XD) memory), a random access memory (RAM), a static random access memory (SRAM), a read only memory (ROM), an electrically erasable programmable read only memory (EEPROM), a programmable read only memory (PROM), a magnetic memory, a magnetic disc, an optical disc, etc.

The route information extractor 320 may receive a destination from the user, may search for a traveling route from a current position to the destination using a route search algorithm, and may match the searched traveling route to the map, resulting in extraction of road modeling DB information. The road modeling DB information may include information regarding a road, gradient, curvature, and vehicle speed on the basis of road topographical information (including X-axis coordinates, Y-axis coordinates, and Z-axis coordinates) having continuity or discontinuity present on a precise map of a traveling route.

The road modeler 330 may receive road modeling DB information extracted from the route information extractor 320, and may calculate a short-distance/long-distance gradient road model and a curved road model using the map information linear simplification algorithm.

In addition, the road modeler 330 may define three road shapes to perform the road modeling, may divide a traveling route into three forward sections in real-time using a section band to a maximum modeling distance, and may then transmit a section distance for each road model, an average valid gradient, an average valid curvature, and average valid vehicle speed information as an event signal on the basis of three forward sections.

A method for transmitting signals through the road modeler 330 may continuously transmit the road modeling information for each of three initial proximity forward sections on which the vehicle 1 travels. Thereafter, whenever the vehicle passes through each section, information of a maximum of three forward sections is updated and the updated result is then transmitted.

The ADAS device 400 may generate data needed for assisting driving or traveling of the vehicle driver using the road modeling information transmitted from the route information transmission device 300, may control the driving or traveling of the vehicle driver, and may include a route information corrector 410 and an ADAS controller 420.

The route information corrector 410 may receive road model information transmitted from the route information transmission device 300, may determine the presence or absence of road model information validity upon receiving the road model information from the route information transmission device 300, and may store a forward-section residual distance for each road model of valid-section information, a forward-section average valid gradient, a forward-section average valid curvature, and a forward-section average valid vehicle speed.

The ADAS controller 420 may control various ADAS functions (energy estimation management, inertia traveling guide, LDC variable control, estimation gearshift, etc.) of a vehicle controller 430 such as electronic control unit (ECU) using valid route information decided by the route information corrector 410.

Various data may communicate between the route information transmission device 300 and the ADAS device 400 through a network embedded in the vehicle 1. In accordance with the present disclosure, the network of the vehicle 1 may indicate a controller area network (CAN). The controller area network (CAN) may be a vehicle network providing serial digital communication between various control devices of the vehicle 1, and may indicate a communication network providing communication in real-time by replacing complicated electric lines and relay of electronic components embedded in the vehicle 1 with a serial communication line. However, the scope or spirit of the network is not limited thereto, and various kinds of data may be communicated between the route information transmission device 300 and the ADAS device 400 through various networks available in the vehicle 1 without departing from the scope or spirit of the present disclosure.

The ADAS 1000 may further include a sound input to receive an acoustic or sound signal as an input; and a sound output to output the acoustic or sound signal.

The sound input may include a microphone to receive an external sound signal from the route information transmission device 300 as well as to convert the received sound signal into an electric signal. Furthermore, the sound input may further include an amplifier to amplify the electric signal converted by the microphone; an analog-to-digital converter (ADC) to digitize the electric signal converted by the microphone, etc.

The sound output may include a speaker to convert the electric signal into the acoustic or sound signal as well as to output the converted sound signal to outside of the route information transmission device 300. The sound output may further include a digital-to-analog converter (DAC) to convert the digitized electric signal into an analog electric signal, an amplifier to amplify the analog electric signal received from the DAC, etc.

A map based ADAS, a vehicle including the same, and a method for controlling the same according to the present disclosure will hereinafter be described with reference to the attached drawings.

FIG. 4 illustrates a table in which three road shapes are defined in a map based ADAS according to an embodiment in the present disclosure. FIG. 5 illustrates a gradient profile of actual roads represented by gradient types defined in FIG. 4. FIG. 6 illustrates a gradient profile from which overlap types of FIG. 5 are removed.

In FIG. 4, gradient types of the road may be broadly classified into a downhill road, a flatland, and an uphill road.

The gradient profile of actual roads may be represented by a total of 27(3ˆ3) gradient roads as three contiguous gradient types. If overlap types are removed from the total of 27 gradient roads, a total number of gradient profiles of the actual roads may be denoted by 21. In conclusion, it may be possible to estimate a traveling situation using only three contiguous forward sections located in a forward direction.

In addition, the road curvature types may be classified into a left curve, a straight line, and a right curve, and the modeling of the curved road may obtain the same result as the modeling of the gradient road.

In addition, the road modeler 330 may divide the traveling route into three forward sections, may determine three forward sections (n, n+1, n+2) of the route in real-time using a section band to a maximum modeling distance, and may transmit a section distance for each road model, an average valid gradient, an average valid curvature, and average valid vehicle speed information on the basis of three forward sections (n, n+1, n+2) as an event signal.

First, the modeling of the gradient road can transmit the section distance/average valid gradient for each of three forward sections (n, n+1, n+2) of the route, and a detailed description thereof will hereinafter be given with reference to FIGS. 7 to 9.

Figure 7:
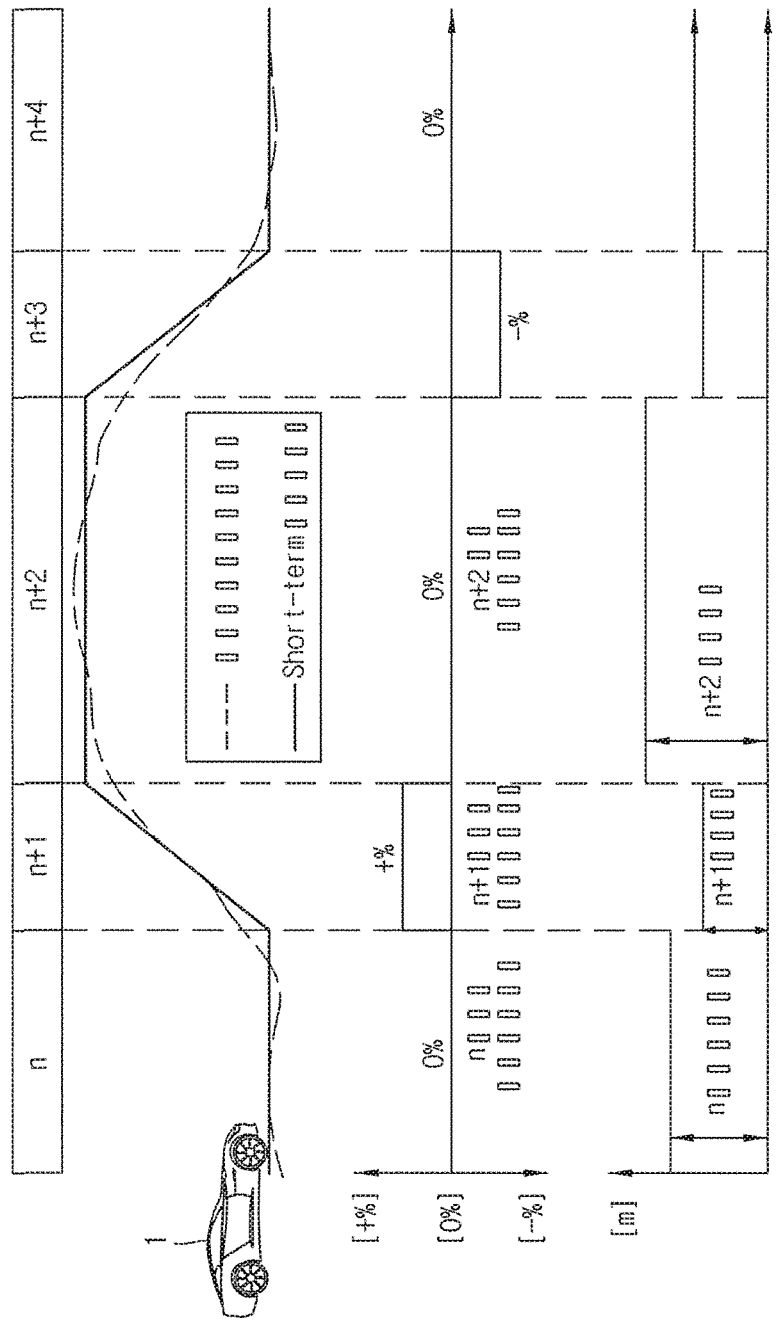
FIG. 7 is a conceptual diagram illustrating a linear simplification gradient road modeling for use in a map based ADAS according to an embodiment in the present disclosure.

FIG. 7 is a conceptual diagram illustrating a linear simplification gradient road modeling for use in a map based ADAS according to an embodiment in the present disclosure. FIG. 8 illustrates a gradient region variation of the gradient road modeled in FIG. 7. FIG. 9 illustrates an invalid section on the basis of the presence or absence of validity of modeling information of gradient roads transmitted in FIG. 8.

In FIG. 7, the modeling type may be a short-distance/long-distance gradient road model, and the modeling distance may be denoted by Km/Km, the modeling distance may be three forward sections (n, n+1, n+2), and the modeling transmission information may be the section distance/section average valid gradient for each of three sections. Here, the design factor may be set to the AVN Engineering mode.

When the vehicle 1 starts traveling, the road modeler 330 divides the traveling route into three forward sections, and transmits the section distance for each of three forward sections (n, n+1, n+2) and the section average valid gradient.

Gradient types of the road may be classified into a downhill road, a flatland, and an uphill road, and the gradient of the actual road may be modeled by combination of three consecutive gradient types.

Figure 8:
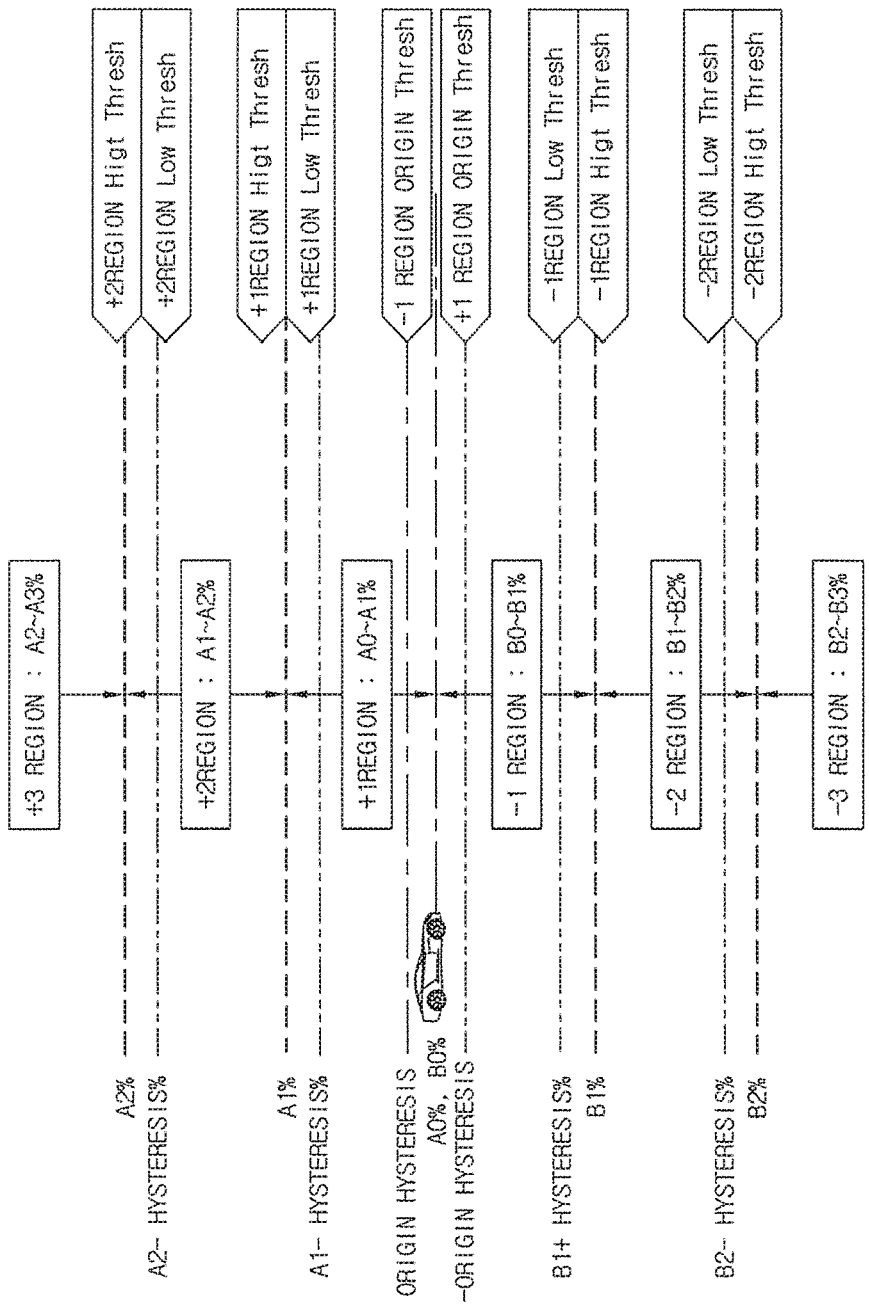
FIG. 8 illustrates a gradient region variation of the gradient road modeled in FIG. 7.

In FIG. 8, the modeled gradient road may be changed to the positive (+) gradient region or the negative (−) gradient region according to an uphill road or a downhill road.

For example, if the corresponding gradient is higher than a high threshold value in the positive (+) gradient region in which the gradient type is an uphill road, the gradient region is changed from the gradient (0) region to the gradient (+1) region. In the positive (+) gradient region in which the gradient type is the uphill road, if the corresponding gradient is less than a low threshold value, gradient modeling is performed in such a manner that the gradient (+1) region is changed to the gradient (0) region.

When the corresponding gradient is less than a high threshold value in the negative (−) gradient region in which the gradient type is a downhill road, the gradient region is changed from the gradient (0) region to the gradient (−1) region. During the negative (−) gradient region in which the gradient type is the downhill road, if the corresponding gradient is higher than a low threshold value, gradient modeling is performed in such a manner that the gradient (−1) region is changed to the gradient (0) region.

As can be seen from FIG. 8, the gradient (+1) region may correspond to A0-A1%, the gradient (+2) region may correspond to A1-A2%, and the gradient (+3) region may correspond to A2-A3%, such that the positive (+) gradient region may be identified on the basis of A1%.

As can be seen from FIG. 8, the gradient (−1) region may correspond to B0-B1%, the gradient (−2) region may correspond to B1-B2%, and the gradient (−3) region may correspond to B2-B3%, such that the negative (−) gradient region may be classified on the basis of B1%.

A high threshold value (High Thresh) and a low threshold value (Low Thresh) may be assigned to the respective classified gradient regions.

The road modeler 330 may decide three forward sections in real-time using a section band to a maximum modeling distance, and may transmit gradient road model information of three forward sections located within the modeling distance.

Figure 9:
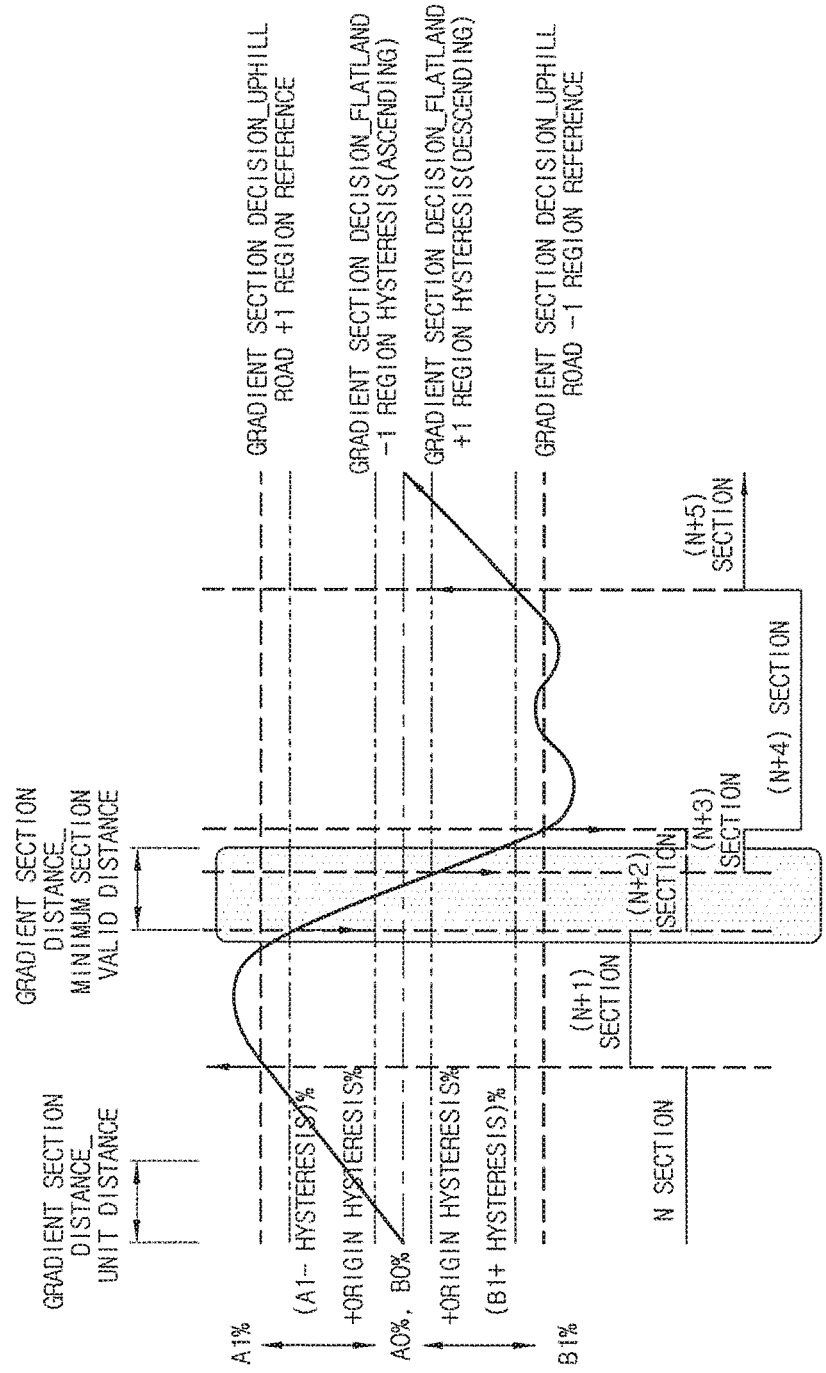
FIG. 9 illustrates an invalid section on the basis of the presence or absence of validity of modeling information of gradient roads transmitted in FIG. 8.

Therefore, the route information corrector 410 may receive the gradient road model information from the road modeler 330, and may determine the presence or absence of validity of the gradient road model information as shown in FIG. 9.

In FIG. 9, the section average valid gradient decided by the route information corrector 410 may indicate an average value of all gradients, and the modeling section distance must be longer than a minimum section valid distance. A detailed description thereof will hereinafter be given with reference to FIG. 10.

Figure 10:
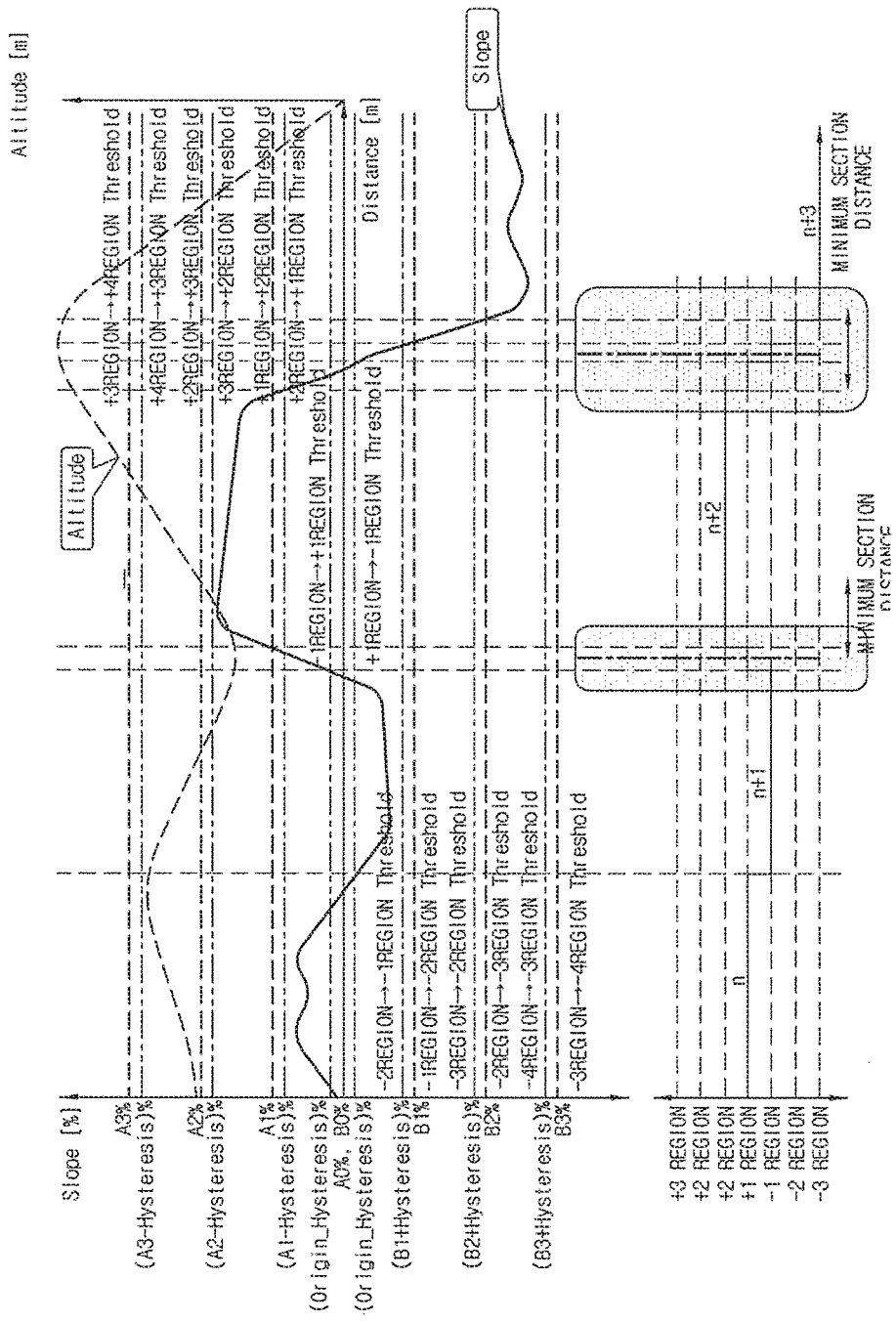
FIG. 10 illustrates exemplary gradient road modeling extracted using a linear simplification algorithm for use in a map based ADAS according to an embodiment in the present disclosure.

FIG. 10 illustrates exemplary gradient road modeling extracted using a linear simplification algorithm for use in a map based ADAS according to an embodiment in the present disclosure.

As can be seen from FIG. 10, when a corresponding section distance is longer than the minimum section valid distance, this section may be determined to be a valid section. When the corresponding section distance is shorter than the minimum section valid distance, this section may be determined to be an invalid section. Here, a reference for classification of a previous valid section and the next valid section may be set to a center portion of the invalid section.

The road modeler 330 may output the gradient road model information of a maximum of three proximity sections (n, n+1, n+2) on the basis of the current position of the vehicle 1, and may output the gradient road model information of the three proximity sections (n+1, n+2, n+3).

Thereafter, the gradient road modeling may transmit the section residual distance/section average valid curvature for each of three forward sections (n, n+1, n+2) of the route, and a detailed description thereof will hereinafter be given with reference to FIGS. 11 to 13.

Figure 11:
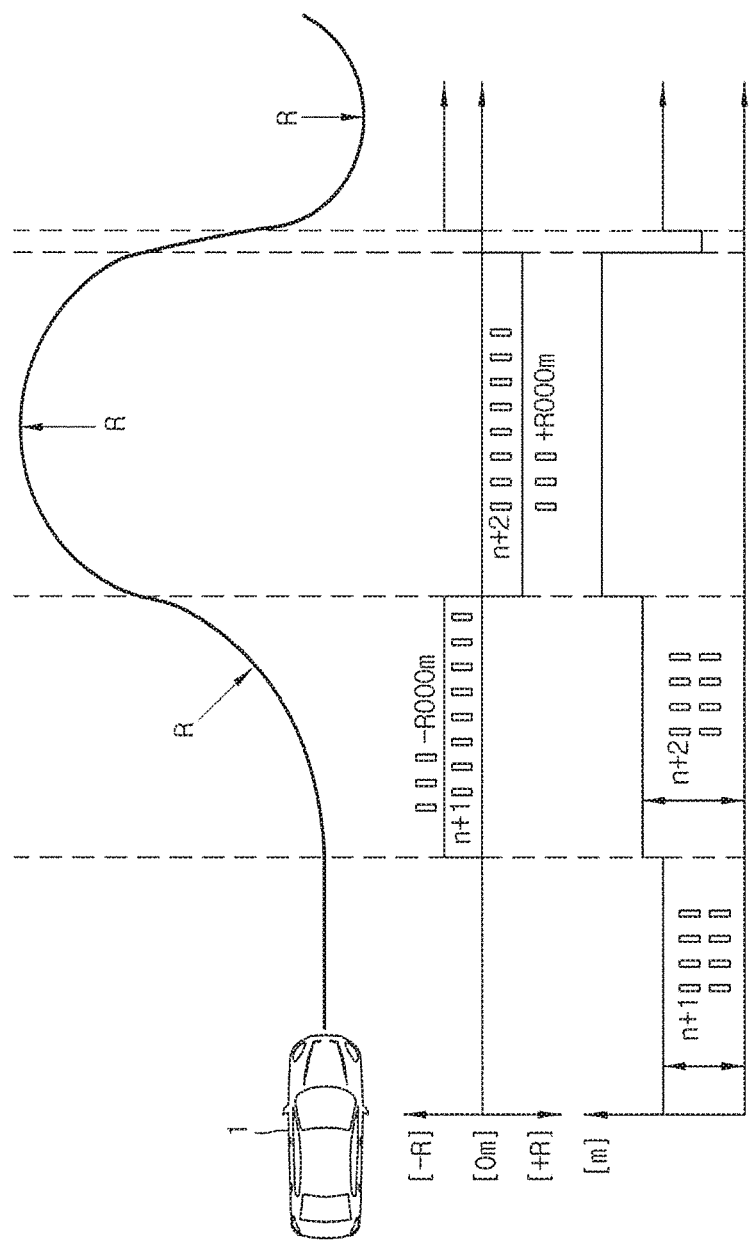
FIG. 11 illustrates linear simplification curved road modeling for use in a map based ADAS according to an embodiment in the present disclosure.

FIG. 11 illustrates linear simplification curved road modeling for use in a map based ADAS according to an embodiment in the present disclosure. FIG. 12 illustrates a curvature region variation of the curved road modeled in FIG. 11. FIG. 13 is a conceptual diagram illustrating the presence or absence of validity of modeling information of the curved roads transmitted in FIG. 12.

In FIG. 11, the modeling type may be a curved road model, and the modeling distance may be denoted by 2 Km, the modeling section is a first forward section (n+1), and the modeling transmission information may be the section residual/section average valid curvature. In this case, the design factor may be set to the AVN Engineering mode.

Referring to FIG. 11, when the vehicle 1 starts traveling, the road modeler 330 may transmit a residual section distance of the first forward section (n+1) on a traveling route, and the section average valid gradient.

The road curvature types may be classified into a left curve line, a straight line, and a right curve, and the gradient of the actual road may be modeled by a combination of three consecutive gradient types. In this case, the modeling region of the modeled gradient curvature may be classified as shown in FIG. 11.

Figure 12:
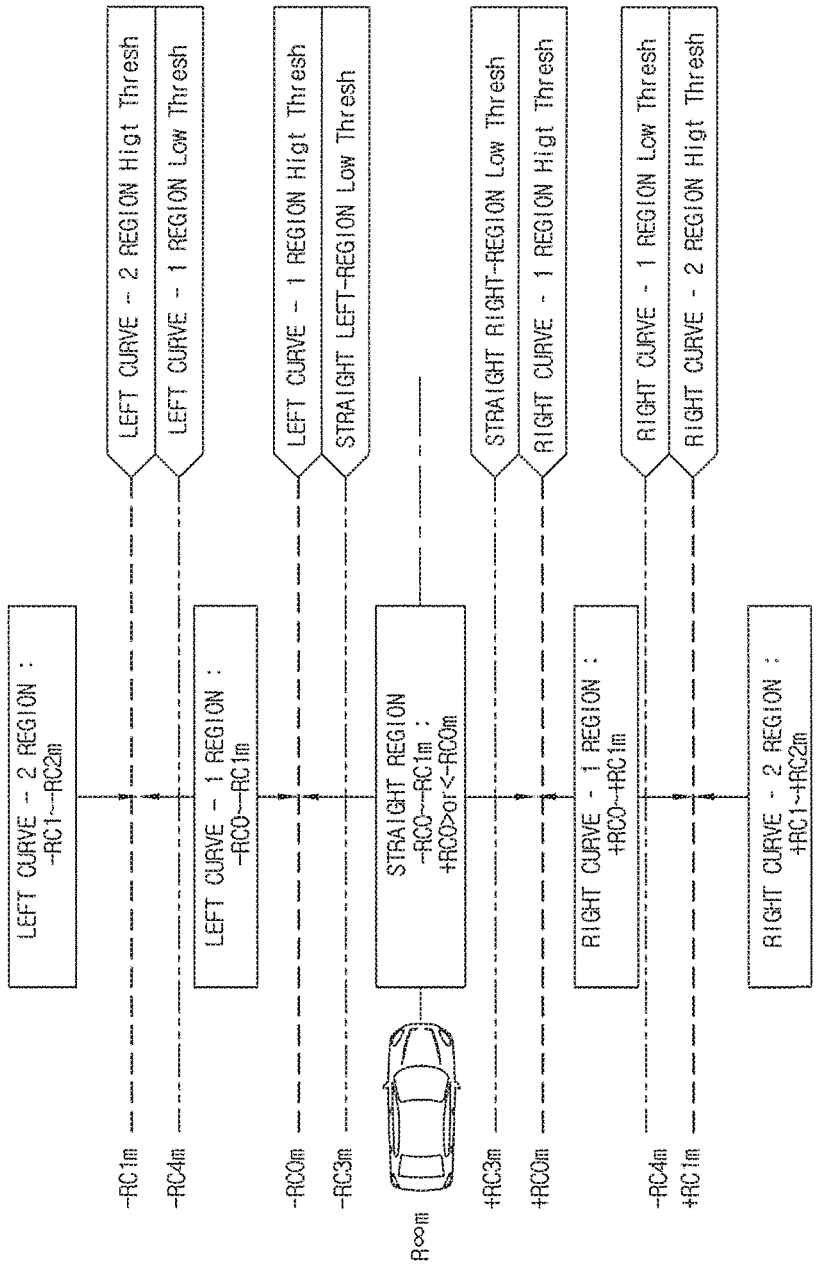
FIG. 12 illustrates a curvature region variation of the curved road modeled in FIG. 11.

In FIG. 12, the modeled curved road may be changed to the positive (+) curvature region or the negative (−) curvature region according to a right curve or a left curve.

For example, if the corresponding curvature is less than a right-curve-line high threshold value (High Thresh) in the positive (+) curvature region in which the curvature type is a right curve, the curvature region is changed from the straight region to the right curve. During the positive (+) curvature region, if the corresponding gradient is higher than a low threshold value, curvature modeling is performed in such a manner that the curvature region is changed from the right-sided curved region to the straight region.

When the corresponding curvature is higher than a right-curve-line high threshold value (High Thresh) in the negative (−) curvature region in which the curvature type is a left curve, the curvature region is changed from the straight region to the left-sided curved region. During the negative (−) curvature region in which the curvature type is the left-sided downhill road, if the corresponding curvature is higher than a left-sided-curved-line low threshold value (Low Thresh), curvature modeling is performed in such a manner that the curvature region is changed from the left-sided curved region to the straight region.

Referring to FIG. 12, the straight region may correspond to a specific region in which the curvature is less than +RC0m and is also less than −RC0m, a first left-sided curved region may correspond to a specific region in which the curvature is in the range of −RC0m to −RC1m, a second left-sided curved region may correspond to a specific region in which the curvature is in the range of −RC1m to −RC2m, a first right-sided curved region may correspond to a specific region in which the curvature is in the range of +RC0m to +RC1m, and a second right-sided curved region may correspond to a specific region in which the curvature is in the range of +RC1m to +RC2m.

A high threshold value (High Thresh) and a low threshold value (Low Thresh) may be assigned to respective curvature regions (i.e., a left region of the straight region, a right region of the straight region, a left-sided curved region, and a right-sided curved region).

The road modeler 330 may decide the first forward section in real-time using the section band to a maximum modeling distance, and may transmit curved road model information of the first forward section located within the modeling distance.

Figure 13:
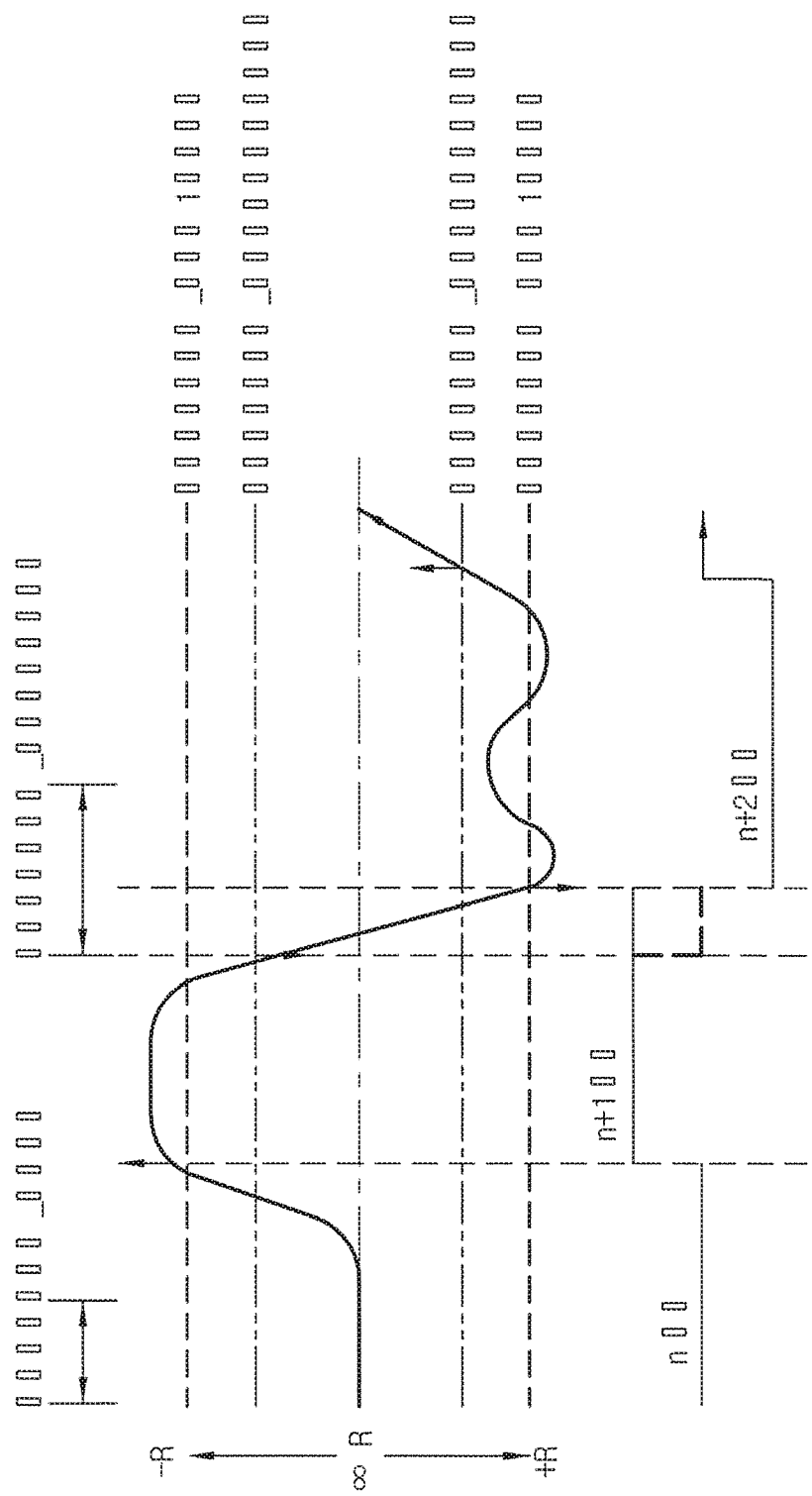
FIG. 13 is a conceptual diagram illustrating the presence or absence of validity of modeling information of the curved road transmitted in FIG. 12.

Therefore, the route information corrector 410 may receive the curved road model information from the road modeler 330, and may determine the presence or absence of validity of the curved road model information as shown in FIG. 13.

In FIG. 13, the section average valid curvature decided by the route information corrector 410 may indicate an average curvature value of the corresponding section, and the modeling section distance must be longer than a minimum section valid distance.

Therefore, the route information corrector 410 may store the forward section residual distance of the curved road model information determined as a valid section, and the forward section average valid curvature.

A method for controlling the map based ADAS 1000 to perform linear simplification road modeling of map information as well as to transmit signals according to an embodiment of the present invention will hereinafter be described with reference to FIG. 14.

Figure 14:
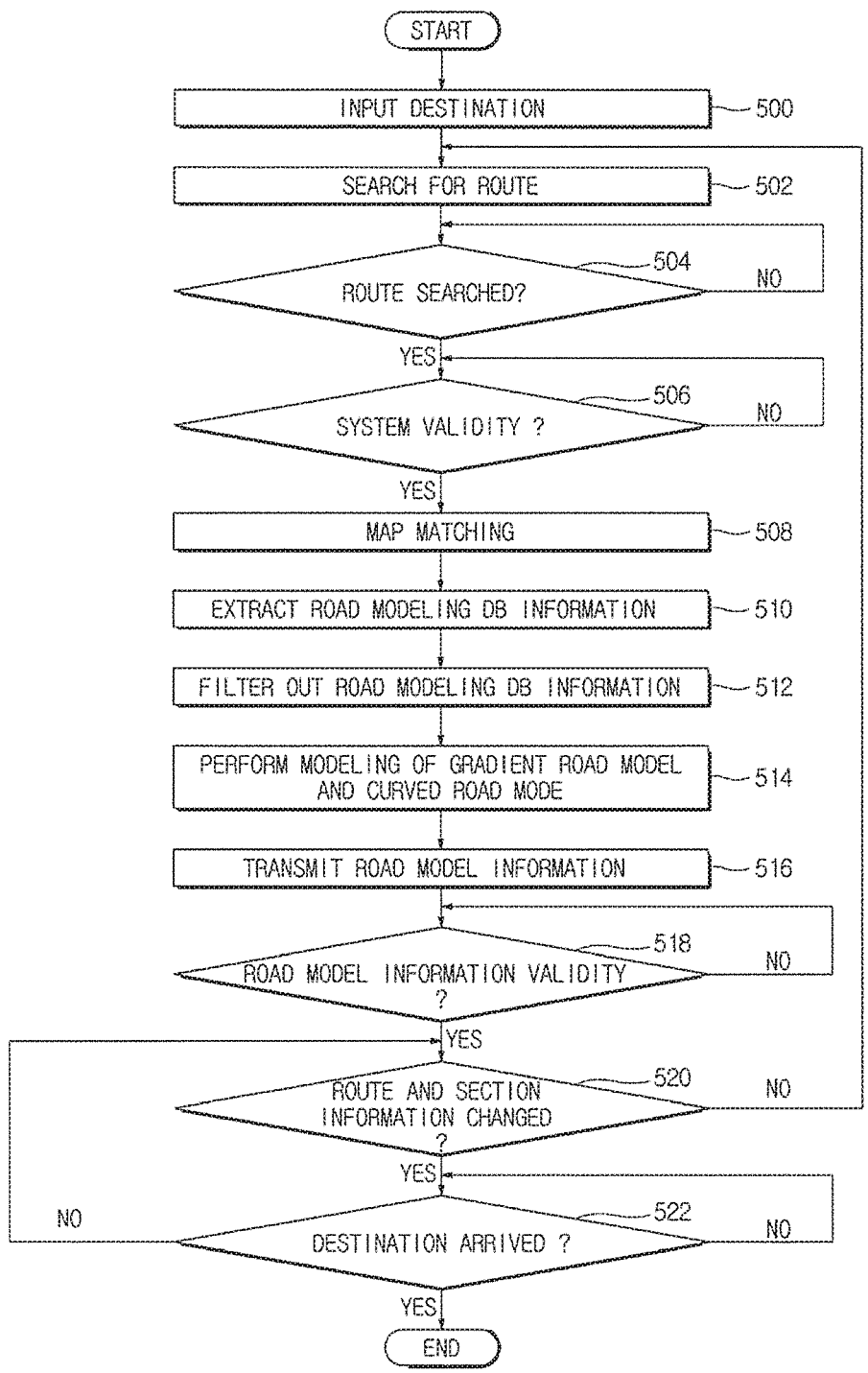
FIG. 14 is a flowchart illustrating road modeling and signal transmission algorithm for use in a map based ADAS according to an embodiment in the present disclosure.

FIG. 14 is a flowchart illustrating road modeling and signal transmission algorithm for use in a map based ADAS according to an embodiment in the present disclosure.

Referring to FIG. 14, a user may input a destination through a user interface (UI) 100 in operation 500. In accordance with the destination input method, the user may input a search word (e.g., a destination name or a destination address) through a screen image needed for destination search. If the search word is input, the route information transmission device 300 may display the user-input search word on the destination display region contained in the destination input screen image displayed on the display 120.

In addition, the user may input a desired destination through his or her voice signal. If the user speaks a search word of the destination, the route information transmission device 300 may receive a user voice signal through a sound input, analyze the user voice signal, and thus recognize the search word spoken by the user.

If the destination is input, the route information transmission device 300 may calculate a current position of the vehicle 1 on the basis of position information transmitted through the communicator 200, and may search for the traveling route from the current position to the destination using the route search algorithm in operation 502. Subsequently, the user may select the searched traveling route in operation 504.

If the traveling route is selected, the route information transmission device 300 may determine the presence or absence of validity of the selected traveling route in operation 506. If the presence of validity of the selected traveling route is decided, the searched traveling route is matched to the map and then displayed in operation 508.

In this case, the route information extractor 310 may calculate the road model obtained by linearly simplifying map information of the traveling route, and may extract the road modeling DB information (gradient information, curvature information) in operation 510.

The road modeling DB information extracted from the route information extractor 310 may be received by the road modeler 330, and then filtered out in operation 512. The road modeler 330 may perform modeling of the short-distance/long-distance gradient road model and the curved road model using the map information linear simplification algorithm in operation 514.

In addition, the road modeler 330 may divide the traveling route into three forward sections, may determine a section in real-time using the section band to a maximum modeling distance, and may transmit a section distance for each road model, an average valid gradient, an average valid curvature, and average valid vehicle speed information as an event signal on the basis of three forward sections in operation 516.

A method for transmitting signals through the road modeler 330 may continuously transmit the road modeling information for each of three initial proximity forward sections on which the vehicle 1 travels. Thereafter, whenever the vehicle passes through each section, the section is updated to the first section or the second section and signals are then transmitted.

The route information corrector 410 may receive the short-distance/long-distance gradient road model information and the road model information modeled by the road modeler 330, may determine the presence or absence of validity of the road model information, and may store a forward-section residual distance for each road model of valid-section information, a forward-section average valid gradient, a forward-section average valid curvature, and a forward-section average valid vehicle speed in operation 518.

The route information transmission device 300 then may determine whether the route and section information was changed in operation 520. If the route and section information are changed, the operation process feeds back to operation 502 and then performs subsequent operation.

If the route and section information are unchanged in operation 520, it is determined whether the vehicle 1 arrives at the destination in operation 522.

If the vehicle 1 does not arrive at the destination in operation 522, the operation process feeds back to operation 520, and performs the subsequent operation. If the vehicle 1 arrives at the destination, the operation process finishes.

Meanwhile, the ADAS controller 420 may also control various ADAD functions (energy estimation management, inertia traveling guide, LDC variable control, estimation gearshift, etc.) of the vehicle controller 430 using valid route information decided by the route information corrector 410.

Figure 15:
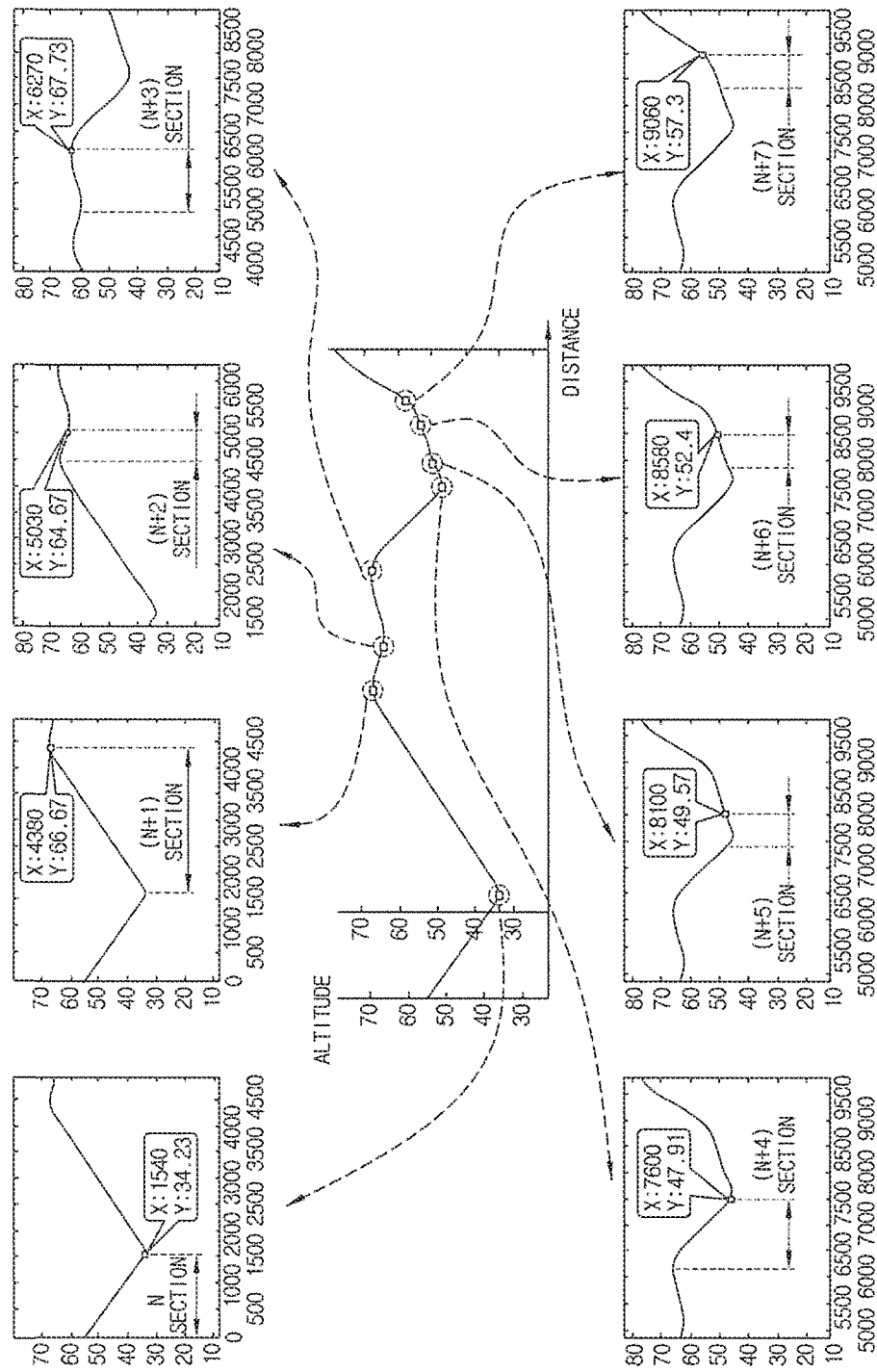
FIG. 15 illustrates road modeling results for use in a map based ADAS according to an embodiment in the present disclosure.

FIG. 15 illustrates road modeling results for use in a map based ADAS according to an embodiment in the present disclosure.

FIG. 15 illustrates an example of a modeling result of a specific section (of about 9 km) from Bibong interchange (IC) to Dundae junction (JC) of the first Seohaean Expressway.

In FIG. 15, the forward section can be modeled in such a manner that a traveling situation is estimated from road topographical information having continuity or discontinuity present in a precise map of a traveling route. In accordance with the modeling result, the traveling route section may be classified into a plurality of sections (n, n+1, n+2, n+3, n+4, n+5, n+6, n+7).

Subsequently, road modeling DB information for each section is extracted, such that a section distance for each road model, a section average valid gradient, a section average valid curvature, section average valid vehicle speed, etc. can be extracted.

As is apparent from the above description, the map based ADAS, the vehicle including the same, and the method for controlling the same according to the embodiments can classify map information needed to implement the ADAD control logic into short-distance information and long-distance information, and can transmit information minimized by linear simplification road modeling, such that system efficiency can be improved and network load can be reduced. In addition, with the rapid development of control systems interoperable with various traveling route information, user convenience, fuel efficiency and operational performance can be improved.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An advanced driver assist system (ADAS) comprising:
   a user interface (UI) configured to receive a destination from a user;
   a communicator configured to transmit position information of a vehicle;
   a route information transmission device configured to calculate a current position of the vehicle based on the position information and to transmit road model information by modeling map information of a traveling route from the calculated current position to the destination; and
   an ADAS control device configured to output a section residual distance, a section average valid gradient, and a section average valid curvature, based on the transmitted road model information,
   wherein the ADAS control device includes:
   a route information corrector configured to receive the road model information and to determine validity of the road model information; and
   an ADAS controller configured to control various ADAS functions using the valid route model information determined by the route information corrector.

2. The ADAS according to claim 1, wherein the route information transmission device includes:

a route information extractor configured to search for the traveling route, to match the searched traveling route to a map, and to extract road modeling database (DB) information; and a road modeler configured to receive the road modeling DB information extracted from the route information extractor and to calculate a short-distance/long-distance gradient road model and a curved road model using a map information linear simplification algorithm.

3. The ADAS according to claim 2, wherein the road modeler defines three road shapes on which the vehicle travels, divides the traveling route into a plurality of forward sections, and transmits a section distance, an average valid gradient, an average valid curvature, and average valid vehicle speed information, for each road model.

4. The ADAS according to claim 3, wherein the road modeler continuously transmits road model information for each of three initial proximity forward sections on which the vehicle travels, updates information of a maximum of three forward sections whenever the vehicle passes through one section, and transmits a signal related to the updated result.

5. The ADAS according to claim 4, wherein the route information corrector stores a forward-section residual distance, a forward-section average valid gradient, a forward-section average valid curvature, and a forward-section average valid vehicle speed, for each road model.

6. The ADAS according to claim 2, wherein the road modeler divides the traveling route into three forward sections, determines three forward sections of the route in real-time up to a maximum modeling distance, and then transmits a section distance, an average valid gradient, an average valid curvature, average valid vehicle speed information, for each road model, on the basis of the three forward sections.

7. The ADAS according to claim 1, wherein the route information transmission device and the ADAS control device communicate with each other through controller area network (CAN) communication.

8. An ADAS comprising:
a user interface (UI) configured to receive a destination from a user;
a communicator configured to transmit position information of a vehicle;
a route information extractor configured to calculate a current position of the vehicle based on the position information, to search for a traveling route from the calculated current position to the destination, to match the searched traveling route to a map, and to extract road modeling database (DB) information;
a road modeler configured to receive the road modeling DB information extracted from the route information extractor and to calculate a short-distance/long-distance gradient road model and a curved road model using a map information linear simplification algorithm;
a route information corrector configured to determine validity of road model information upon receiving the road model DB information from the road modeler and to store a forward-section residual distance, a forward-section average valid gradient, a forward-section average valid curvature, and a forward-section average valid vehicle speed, for each of the short-distance/long-distance gradient road model and the curved road model; and
an ADAS controller configured to control various ADAS functions using the forward-section residual distance, the forward-section average valid gradient, the forward-section average valid curvature, and the forward-section average valid vehicle speed, for each road model.

9. A method for controlling an advanced driver assist system (ADAS) comprising:
receiving a destination through a user interface (UI);
receiving position information of a vehicle through a communicator;
calculating, by a route information transmission device, a current position of the vehicle based on the position information, and searching for a traveling route from the calculated current position to the destination;
transmitting, by the route information transmission device, road model information by modeling map information of the searched traveling route;
determining, by a route information corrector, validity of the transmitted road model information, and outputting a section residual distance a section average valid gradient, and a section average valid curvature, from the valid road model information; and
controlling an ADAS function using the section residual distance, the section average valid gradient, and the section average valid curvature.

10. The method according to claim 9, wherein the step of transmitting the road model information includes:
extracting road modeling database (DB) information by matching the searched traveling route to a map; and
modeling a short-distance/long-distance gradient road model and a curved road model from the extracted road modeling DB information using a map information linear simplification algorithm.

11. The method according to claim 10, wherein the step of modeling includes:
defining three road shapes on which the vehicle travels;
dividing the traveling route into three forward sections up to a maximum modeling distance; and
transmitting a section distance, an average valid gradient, an average valid curvature, and an average valid vehicle speed, for each road model, based on the three forward sections.

12. The method according to claim 11, wherein the step of modeling further includes:
transmitting, by modeling the gradient road model, a section distance for each of the three forward sections and an average valid gradient.

13. The method according to claim 11, wherein the step of modeling further includes:
transmitting, by modeling the curved road model, a section residual distance for each of the three forward sections and an average valid curvature.

14. The method according to claim 11, wherein the step of transmitting the section distance, the average valid gradient, the average valid gradient, and the average valid vehicle speed includes:
continuously transmitting road model information for each of three initial proximity forward sections on which the vehicle travels; and
updating information of a maximum of three forward sections whenever the vehicle passes through one section, and transmitting a signal regarding the updated information.

15. The method according to claim 11, wherein the step of determining the validity of the road model information includes:

determining the presence of a valid section when a modeling section distance is longer than a minimum section valid distance; and determining the presence of an invalid section when the modeling section distance is shorter than the minimum section valid distance.

16. The method according to claim 9, wherein the ADAS controls the ADAS function through controller area network (CAN) communication.

* * * * *